(12) United States Patent
Belleville et al.

(10) Patent No.: US 6,387,517 B1
(45) Date of Patent: *May 14, 2002

(54) INORGANIC POLYMER MATERIAL WITH TANTALIC ACID ANHYDRIDE BASE, IN PARTICULAR WITH HIGH REFRACTIVE INDEX, MECHANICALLY ABRASIONPROOF, METHOD OF MANUFACTURE, OPTICAL MATERIALS COMPRISING SUCH MATERIAL

(75) Inventors: Philippe Belleville, Courbevoie; Hervé Floch, Salles; Philippe Prene, Courtry, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,763

(22) PCT Filed: Feb. 6, 1998

(86) PCT No.: PCT/FR98/00229

§ 371 Date: Sep. 14, 1999

§ 102(e) Date: Sep. 14, 1999

(87) PCT Pub. No.: WO98/34876

PCT Pub. Date: Aug. 13, 1998

(30) Foreign Application Priority Data

Feb. 10, 1997 (FR) .............................. 97 01486

(51) Int. Cl.$^7$ .............................. C09D 1/00; B32B 9/00; C01G 35/00

(52) U.S. Cl. ................. 428/447; 428/446; 428/448; 428/470; 428/472; 428/212; 427/162; 427/299; 427/407.1; 427/419.3; 427/515; 106/286.2; 106/287.18; 525/16

(58) Field of Search ................. 428/212, 446, 428/432, 447, 448, 450, 470, 472, 697; 427/515, 162, 299, 407.1, 419.3; 106/286.2, 287.18; 525/16

(56) References Cited

U.S. PATENT DOCUMENTS

| 2,432,483 A | 12/1947 | Miller et al. ................. 192/24 |
| 2,432,484 A | 12/1947 | Moulton et al. ................. 88/1 |
| 2,466,119 A | 4/1949 | Moulton et al. ................. 88/1 |

(List continued on next page.)

FOREIGN PATENT DOCUMENTS

| DE | 736411 | 6/1943 |
| DE | 937913 | 1/1956 |
| EP | 0 008 215 | 2/1980 |

(List continued on next page.)

OTHER PUBLICATIONS

T. Ohishi, et al., "Synthesis and Properties of Tantalum Oxide Films Prepared by the Sol–Gel Method Using Photo–Irradiation," *Journal of Non–crystalline Solids*, 147,148, (1992), pp. 493–498. No Month.

"Colloidal Sol–Gel Optical Coatings," *The American Ceramic Society Bulletin*, vol. 69, No. 7, pp. 1 141–1 143, 1990.

T.J. Rehg, et al., "Solgel Derived Tantalum Pentoxide Films as Ultraviolet Antireflective Coatings for Silicon," *Applied Optics*, vol. 28, No. 24, Dec. 15, 1989, pp. 5215–5221, XP000086699.

*Primary Examiner*—Deborah Jones
*Assistant Examiner*—Stephen Stein
(74) *Attorney, Agent, or Firm*—Burns, Doane, Swecker & Mathis LLP

(57) ABSTRACT

The invention relates to an inorganic polymer material based on tantalum oxide, notably with a high refractive index and mechanically resistant to abrasion, its method of manufacture, in particular making use of precursors based on chlorinated derivatives of tantalum, and optical materials such as antiglare materials and reflecting materials manufactured from this material.

56 Claims, 2 Drawing Sheets

U.S. PATENT DOCUMENTS

| | | | |
|---|---|---|---|
| 2,584,905 A | 2/1952 | Moulton et al. | 106/287 |
| 2,710,267 A | 6/1955 | Boyd et al. | 117/124 |
| 2,768,909 A | 10/1956 | Haslam | 117/121 |
| 3,460,956 A | 8/1969 | Dable | 106/287 |
| 3,875,043 A * | 4/1975 | Franks et al. | 204/290 |
| 4,271,210 A | 6/1981 | Yoldas | 427/169 |
| 4,272,588 A | 6/1981 | Yoldas et al. | 428/433 |
| 4,328,260 A | 5/1982 | Whitehouse | 427/75 |
| 4,929,278 A | 5/1990 | Ashley et al. | 106/287.12 |
| 4,966,812 A | 10/1990 | Ashley et al. | 428/412 |
| 5,476,717 A | 12/1995 | Floch | 428/421 |
| 5,623,375 A | 4/1997 | Floch et al. | 359/883 |
| 5,698,266 A | 12/1997 | Floch et al. | 427/376.2 |
| 5,858,526 A | 1/1999 | Floch et al. | 428/327 |
| 6,180,188 B1 * | 1/2001 | Belleville et al. | 427/515 |

FOREIGN PATENT DOCUMENTS

| | | |
|---|---|---|
| FR | 2635530 | 2/1990 |
| FR | 2682486 | 4/1993 |
| FR | 2703791 | 10/1994 |
| FR | 2707763 | 6/1995 |
| FR | 2680583 | 2/1996 |
| JP | 55-010455 | 6/1980 |
| JP | 03291247 * | 12/1991 |
| JP | 06-298777 * | 10/1994 |

* cited by examiner

INORGANIC POLYMER MATERIAL WITH TANTALIC ACID ANHYDRIDE BASE, IN PARTICULAR WITH HIGH REFRACTIVE INDEX, MECHANICALLY ABRASIONPROOF, METHOD OF MANUFACTURE, OPTICAL MATERIALS COMPRISING SUCH MATERIAL

DESCRIPTION

The invention relates to an inorganic polymer material based on tantalum oxide, notably with a high refractive index and mechanically resistant to abrasion, its method of manufacture, in particular making use of precursors based on chlorinated derivatives of tantalum, and optical materials such as anti-glare materials and reflecting materials manufactured from this material.

The anti-glare materials and the reflecting materials are made up of an organic or inorganic substrate, covered with several layers, certain of which have the specific sought for properties. More precisely, interfering dielectric mirrors comprise a substrate, covered with a dielectric film which reflects one or more desired wavelengths, while at the same time having relatively low intrinsic absorption compared with metals traditionally used to produce mirrors.

The anti-glare or reflecting materials have a multitude of applications.

Hence the organic or inorganic substrates, that is to say particularly plastic or glass substrates, coated with an anti-glare film are of interest particularly in the following fields: ophthalmic products and video or architectural applications such as glass panels placed on the outside or on the inside of buildings. Apart from this, the anti-glare materials and the interfering dielectric mirrors can also be used in high energy lasers, solar applications, heating and photovoltaic applications or in integrated optical systems.

Methods of producing these anti-glare materials or interfering dielectric mirrors are already known from the prior art. These methods are mentioned below.

Furthermore, while in the ophthalmic sector, plastics such as polycarbonates, polyacrylates, polyallylcarbonates and others are particularly interesting, glass substrates are equally interesting, notably in the field of general optics and in the field of screens such as display screens.

It can be easily understood that because of about 4% reflection loss for each air-glass interface and the mean index for glass being 1.5, the losses for a complex optical system are often high.

Consequently, opticians have been seeking for a long time to create coatings with optical properties and notably anti-glare films, using physical deposition processes under vacuum, collectively known as PVD Technology (Physical Vapor Deposition).

Among these methods, there is simple or reactive spraying, simple or reactive evaporation by electronic or ionic heating with or without assistance, etc,.

Despite the excellent optical, chemical and mechanical qualities of the deposits, these techniques require sophisticated equipment which is heavy and costly and processes which are rather long. This is even more so when the surface area of components to be treated becomes large. The result is that such processes are generally poorly suited to cheap line production.

For example, only top of the range cathode tube screens for televisions are at present being given anti-glare coatings applied by PVD.

This is the reason why deposition processes using a gentle chemical route and in particular processes of deposition by the sol-gel route appear to be an interesting alternative to the physical processes of deposition under vacuum.

The method of deposition by the sol-gel route allows one to produce films on substrates which have various optical properties. Such a process when compared with the traditional processes of deposition under vacuum offers a number of advantages among which one may mention, deposition generally carried out at ambient temperature and at atmospheric pressure without having recourse to a thermal stage at temperatures which are too high, reduced capital costs and a simple and rapid method of application that allows for great flexibility of operation.

The deposition of metal or non-metal oxides with optical properties using a sol-gel method has been widely studied. It is apparent that the sol-gel systems or methods can be classified into two categories: polymer methods or systems and colloidal methods or systems.

Each system requires different preparations and operating conditions which depend on the properties of the desired treatment solutions and the nature of the oxide concerned.

The polymer system consists of using, as precursors, monomer, oligomer or low molecular weight species, in solution, with good molecular homogeneity and which are then converted into oxide, after application onto the substrate, by a firing step. The liquid deposited possibly changes in viscosity as evaporation of the solvent progresses until a gel is formed on the substrate. The solid network obtained still containing solvent is then converted into oxide by heating the system generally to temperatures up to 500° C. One then obtains a dense, hard layer, that adheres strongly to the substrate. The conversion into oxide is generally accompanied by a large loss of mass made up of water and organic materials that brings with it a large reduction in the thickness of the layer. This induces high internal stresses, both tensile and compressive, in the deposit which can cause fine cracking of the coating in the case of thick mono- and multi-component films, that is to say films with a thickness that is greater than a few $\mu$m.

For example, German patents DE-A-736 411 and DE-A-937 913 mention the use of hydrolysable compounds for the preparation of various interfering films. The major disadvantage of these methods resides in the indispensable thermal treatment between 500 and 600° C. to convert the polymer intermediates into final dense ceramics. These high temperatures limit the choice for the nature of the substrate to be coated and complicate the industrial application.

The patent U.S. Pat. No. 2,466,119 describes a method of preparing reflecting and/or anti-glare multilayer films by hydrolysis and condensation of mixtures of halides of titanium and/or alkoxides of silicon. The control of the porosity of these layers is carried out by varying the temperature. However to obtain layers having good mechanical strength requires heating to temperatures which are very much greater than those that the usual plastics can tolerate, their thermal stability generally being 150° C. as a maximum.

The patent U.S. Pat. No. 2,584,905 deals with the preparation of reflecting thin layers from alcoholic solutions of $TiCl_4$ and silicon alkoxide. Here also, it is necessary to have resort to a heat treatment step that allows the oxides to be densified in a suitable way. In this method, the problems of fine cracks and spalling linked to the densification of the materials, considerably reduce the development of multi-layer build-ups with high reflection.

The patent U.S. Pat. No. 3,460,956 describes the preparation of reflecting films made of $TiO_2$ from hydrosylates of tetra alkyl titanates, in an alcoholic medium. However, for effective conversion of the polymeric film into dense oxide, it must be heated to heating to temperatures of about 500° C., which penalizes and can be damaging to any organic substrate.

The patents U.S. Pat. Nos. 2,768,909 and 2,710,267 describe the production of reflecting films made of $TiO_2$ from alcoholic sols of an alkoxide of titanium, these sols being hydrolysable by atmospheric moisture. This approach also requires strong firing of the condensed intermediates and the layers obtained are not resistant to abrasion.

The patent U.S. Pat. No. 4,272,588 is concerned with the possibility of increasing the reflectivity of mirrors made of noble metals and the possibility of making them chemically passive, by the deposition of dielectric $TiO_2$ and $Ta_2O_5$ layers arising from molecular precursors.

Such coatings are obtained by essential heating to about 400° C.

Hence, the polymeric material generally used for thin optical layers with a high refractive index (between, for example, 1.9 and 2.1) is titanium oxide ($TiO_2$). However in order to obtain layers that are mechanically resistant to abrasion, the densification must be carried out at high temperature close to 400° C. which could not be considered for plastic substrates for example.

The document U.S. Pat. No. 4,328,260 describes a method and a composition to apply an anti-glare treatment and a grid onto solar cells which includes the application of a mask onto the surface of the cell, the application of a metal oxide paste (Ta, Ti, Nb, Y, Zr, Te) onto the mask, and the heating of the cell to a temperature of 300° C. to 550° C. to decompose the alkoxide and form the metal oxide.

The remaining surfaces are plated with nickel to form a metal grid. The application at the same time of an anti-glare coating and a grid causes problems which are posed in that document, which are fundamentally different to those of this application. Furthermore, the temperatures used to produce the metal oxide are very high and incompatible with a substrate such as an organic substrate. Apart from this, the application of a paste to a substrate does not allow precise control of the deposited thickness.

The document JP-A-55 010455 relates to the preparation of an anti-glare coating on a silicon substrate by deposition of a mixture of tantalum alkoxide and a complexing agent such as acetic acid and heating to a temperature of from 200 to 800° C.

However, such a method has the disadvantages that the stability of the alkoxide solutions is very low, they have a high cost and the temperatures used are not suitable for all substrates.

The document by T. OHISHI et al. "Synthesis and properties of tantalum oxide films prepared by the sol-gel method using photo-irradiation" Journal of Non-crystalline Solids, 147, 148 (1992) 493–498 describes the preparation of thin dielectric layers of $Ta_2O_5$ by deposition of tantalum ethoxide solutions and exposure to ultra-violet rays. The disadvantages of such a method are linked to the use of tantalum alkoxide as precursor, and the thin layers prepared stem from unstable solutions which are subjected to photo-irradiation.

Finally, the document by T. J. REHG et al. "Sol-gel derived tantalum pentoxide films as ultra-violet anti-reflective coating for silicon", Applied Optics, 15.12.1989, Vol.28, N.24, p 5215-, describes a method of preparation of anti-glare coatings on silicon by deposition of a solution of tantalum penta-ethoxide and heat treatment at a temperature of from 300 to 1000° C.

The other method or system of deposition by a sol-gel route is the colloidal method or system in which one uses dispersions of small particles, in particular oxides or fluorides, crystallized or amorphous, either by encouraging a germination-growth mechanism and then by stabilizing the system with a desired degree of nucleation, or by precipitation-peptization in a suitable solvent, to give colloidal suspensions, these suspensions forming what is called a "sol".

During the deposition, the evaporation of the solvent—this being chosen to be sufficiently volatile to evaporate easily—leads to an increase in the concentration of particles which, in most cases, precipitate onto the substrate.

The resulting coating is porous, with no internal stress and mechanically non-resistant to abrasion.

Examples of producing sol/gel layers by such a method are described notably in the patent application U.S. Pat. No. 7,148,458 (NTIS) corresponding to patents U.S. Pat. No. 4,929,278 and U.S. Pat. No. 4,966,812 and in patents U.S. Pat. No. 2,432,483 and U.S. Pat. No. 4,271,210.

The patent application U.S. Pat. No. 7,148,458 (NTIS) describes a method of depositing an anti-glare film on plastic substrates, consisting of synthesizing an ethanolic gel in the system $SiO_2$—$B_2O_3$—$Al_2O_3$—BaO until a certain molecular complexity is obtained, and then of reliquefying this gel mechanically breaking certain interpolymer bridges. In this way, a porous film is obtained with a low refractive index (about 1.23), produced at ambient temperature, which allows it to be made suitable for plastic substrates; however this film only has a mediocre resistance to abrasion.

The American patents U.S. Pat. Nos. 2,432,483 and 4,271,210 disclose the possibility of using colloids of silica or alumina for the creation of dielectric anti-glare coatings, that permits the porosity of these coatings to be increased and therefore lower their refractive indices. If these methods have the advantage of being able to be implemented at low temperatures, the colloidal layers obtained have very low mechanical strength and are particularly sensitive to any physical contact.

In addition, the article entitled "Colloidal Sol-gel Optical Coatings" that appeared in "The American Ceramic Society Bulletin", Vol. 69, No. 7, pp. 1141–1143, 1990, describes a method of depositing thin layers by a sol-gel route using centrifugal surface application.

This article makes clear that using colloidal sol-gel suspensions and carefully choosing volatile solvents to constitute the liquid phase of the colloidal medium, it is possible to carry out treatments at ambient temperature, without excessive heating of the substrate. This technique therefore allows one to treat materials that are thermally fragile.

However, even the nature of these colloidal films, that is to say porous, implies low mechanical strength of these films, both from the point of view of abrasion, and adhesion to the substrate on which they are deposited. Such deposits do not tolerate any physical contact either touching or wiping, without being damaged. The only forces of cohesion which exist in these colloidal films are of the physical adsorption type and there are no chemical bonds whatsoever between the particles and the substrate or between the particles themselves.

The mechanical behavior can however be significantly improved by the addition of a binder between the particles. This binder, in truth a chemical interparticle "joint" can be of the organic, inorganic or hybrid type. It reinforces the mechanical cohesion of the system.

Thin optical layers based on colloidal silica ($SiO_2$) are known from the prior art, from at least three documents that make reference to a significant improvement in their mechanical behavior.

The patent U.S. Pat. No. 2,432,484 discloses the use of a product composed of alcohol, a catalyst and tetraethyl orthosilicate and which uses a chemical binder between the colloidal particles in a way that reinforces the cohesion of the porous structure. This chemical binder is either applied onto the layer of colloidal silica already deposited, or incorporated into the treating medium (that is to say, the colloidal sol) and the whole is applied in a single treatment. Depending on the proportion of chemical binder used, the porosity of the colloidal deposit can remain virtually unchanged and in this way the optical properties can be preserved. The mechanical strength of the film reinforced in this way allows touching and wiping. Furthermore, a supplementary heat treatment of the coating at low temperature, that is to say about 100° C., allows the strength to be increased even more. However, such a deposit remains vulnerable in the event of strong abrasive attack.

From an article by R.G. MUSKET et al. of the Lawrence Livermore National Laboratory of California that appeared in Appl. Phys. Lett., Vol. 52(5), 1988, a method is known of increasing the adhesion of the oxide/oxide interface using an ion beam. The authors describe a treatment by irradiation at 200 keV with helium ions $He^+$, of anti-glare layers based on colloidal silica. This treatment allows one to improve the adhesion of the particles to one another and to the substrate, which ensures that the layer treated in this way has a normal resistance to optical cleaning (wiping) without any modification of optical properties. The explanation advanced for this phenomenon rests on a surface reactivity of the colloidal particles which is increased due to the ionic bombardment.

The French patent application No. 93 03987 of the $5^{th}$ April 1993 from the CEA describes a method of improving the resistance to abrasion of thin layers with anti-glare optical properties by using alkaline reagents after deposition of the film. However, although such a method is carried out at ordinary temperature and pressure, the resistance to abrasion of such layers is insufficient for use by the public at large.

The French patent FR-A-2 680 583 from the CEA describes a material that has anti-glare properties, as well as hydrophobic properties and resistance to abrasion. This material comprises an organic or inorganic type substrate, covered successively by a layer of an adherence promoter produced in a material chosen from among the silanes, an anti-glare layer of silica colloid encased in a siloxane binder, an anti-abrasive layer of a fluorinated polymer. However, this material offers a spectral transmission window of a monolayer coating, of the order of only 100 nm. and a resistance to abrasion which is reasonable without being totally damage-proof.

The French patent application FR 2 682 486 from the CEA describes the preparation of dielectric mirrors with high resistance to a laser flux, by a method carried out at ambient temperature, which makes it suitable for organic substrates. The thin layers having the desired optical properties are prepared from colloidal suspensions, which are deposited by alternating a material with a low refractive index with a material with a high refractive index.

Nevertheless, the colloidal layers used are by nature porous which leads to a low refractive index compared with the index of a film of the same material in a dense form. Consequently, at equivalent reflectivity, it is necessary to stack a larger number of layers in order to make up for this difference in index, which implies a longer treatment, and means the optical coating becoming more fragile.

The French patent application FR 93 08762 from the CEA describes the preparation of composite materials with a high refractive index, characterized in that they include colloids of metal oxide encased in a polyvinyl polymer, soluble in an alcoholic solvent. The organic polymer encasing the colloid leads to a reduction in the residual open porosity between the oxide particles. The result is an increase in the refractive index of the deposited layer, an increase in the mechanical resistance to abrasion properties compared with the corresponding colloidal layer since the polymer serves as a binder between the particles and an improvement in the resistance to the laser flux.

However, the improvement in the mechanical resistance to abrasion properties of the layer obtained necessitates the use of layers of adherence promoters or layers of coupling agents. This increases the manufacturing time and the production costs. Furthermore, the mechanical resistance to abrasion properties remain inadequate particularly in relation to use by the public at large, for example, for the case of producing an anti-glare treatment for screens, notably cathode tube screens for televisions or other equipment.

Therefore the aim of the invention, amongst others, is to overcome the disadvantages of the prior art mentioned above and to provide a material, notably with a high refractive index, having good mechanical strength properties, that is to say among other things a good resistance to abrasion and satisfactory adhesion onto any substrate.

Another aim of the invention is to prepare materials with optical properties, using the material according to the invention, notably with a high refractive index.

The materials with optical properties are for example, materials that have anti-glare properties over a wide or narrow spectral band and among others, good hydrophobic and resistance to abrasion properties that imply because of this, easy cleaning, since the reflecting materials have properties of resistance to abrasion.

This aim and others have been achieved according to the invention by an inorganic polymer based on densified and cross-linked by a heat treatment at a moderate temperature or by exposure to ultra-violet rays. This material is notably a material with a high refractive index, and is, amongst other things, mechanically resistant to abrasion.

According to the characteristics of the invention, the material comprises more particularly, an inorganic polymer of tantalum oxyhydroxide, densified or cross-linked and generally including residual halide ions for example chlorides.

A polymer according to the invention is obtained from a molecular compound or precursor based on tantalum, soluble in a solvent, preferably an alcoholic solvent, which gives an inorganic polymer film (or layer) after densification or cross-linking, for example, by heat treatment and/or exposure to ultra-violet rays or other radiation.

According to the invention, the cross linking-densification heat treatment is generally carried out at a moderate temperature, not very high, namely for example less than or equal to 200° C., preferably less than or equal to 150° C., notably from 100 to 200° C., and the molecular precursor is preferably an anhydrous compound, more preferably a halogen containing compound for example tantalum chloride.

Thanks to the characteristics of the invention, the molecular compound based on tantalum reacts with the water present in the ambient humidity and forms an inorganic polymer during the formation of the film. The densification step brings about cross-linking of this inorganic network, that is the formation of covalent tantalum-oxygen-tantalum chemical bonds. The result is an increase in the refractive index of the deposited layer, linked to the densification of the inorganic network, and an increase in the mechanical resistance to abrasion properties.

The material according to the invention is "based on" tantalum oxide, that is to say that it can be constituted only of tantalum oxide or it can also include, apart form this oxide, at least one other metal or metalloid oxide, chosen preferably from among, silicon oxide, yttrium oxide, scandium oxide titanium oxide, hafnium oxide, thorium oxide, niobium oxide, zirconium oxide, lanthanum oxide, aluminum oxide and magnesium oxide in a proportion for example from 1 to 99%, preferably from 10 to 90%, by mass, with respect to the total mass of metal or metalloid oxides.

Such compounds allow the properties of the material based on tantalum oxide to be varied, in particular the refractive index and the resistance to abrasion.

It is therefore possible to obtain, for example, high indices with a polymeric material constituted only of tantalum oxide or with a polymeric material including apart from tantalum oxide, at least one other metal or metalloid oxide chosen from among the metal or metalloid oxides mentioned above, preferably with the exception of silicon oxide and magnesium oxide.

It will also be possible to obtain high medium or low indices with a polymeric material that includes, apart from tantalum oxide, for example at least silicon oxide and/or magnesium oxide.

The invention also relates to a method of preparation and of deposition of this polymeric material. According to the characteristics of the invention, this method comprises the steps consisting of:
- preparing a solution (1) in a solvent (3) comprising a molecular compound based on tantalum called a tantalum molecular precursor
- possibly mixing said solution (1) with a solution in a solvent of the same kind comprising a compound of a metal or metalloid other than tantalum or adding said metal or metalloid compound to said solution (1); in any case meaning that a solution (2) is obtained
- depositing the solution obtained on a support to form a uniform layer of polymeric material, and
- cross-linking, densifying this polymeric layer based on tantalum oxide by a heat treatment at a moderate temperature, possibly followed by an annealing step or a post-treatment heating step.

According to the invention, this cross-linking-densification is carried out, in particular, by a heat treatment at a moderate temperature, not very high, for example, from 120° to 200° C., preferably not exceeding 150° C. and/or by exposure to UV rays notably of wavelength between about 180 and 280 nm, or by any other method of cross-linking desired at ambient temperature or at a moderate temperature.

Advantageously, the cross-linking temperature of the polymeric material, not exceeding 150° C., and which can even be ambient temperature, in the case of exposure to UV or other radiation, the method is therefore applicable to substrates made of plastic material or any other material that does not tolerate high treatment temperatures.

Furthermore, in the case of cross-linking-densification by UV radiation, the method can be carried out for a significantly shorter period of time.

The invention also relates to an optical material, characterized in that it comprises a substrate of the organic or inorganic type covered by at least one layer of the polymeric material, previously described, based on tantalum oxide, with a high, medium or low refractive index and mechanically resistant to abrasion.

The invention also features such an optical material characterized in that it comprises in addition to a layer of polymeric material based on tantalum oxide with a high refractive index, at least one layer chosen from among
- a layer with a low refractive index, for example, based on colloids of silicon oxide, calcium fluoride or magnesium fluoride encased or not in a siloxane binder, or silicon oxide in polymeric form
- a layer with a medium refractive index, for example, a material based on tantalum oxide and another metal or metalloid oxide
- an anti-abrasive layer, based for example on fluorinated silane.

According to the invention, the layers with low and medium refractive index are preferably densified-crosslinked polymeric layers, preferably under the same conditions as the layer with high refractive index.

Furthermore, the invention also relates to two particular types of optical materials, namely a narrow band or broad band anti-glare material, and a dielectric mirror.

The anti-glare material is characterized in that it comprises a substrate of organic or inorganic nature covered successively by
- a layer of polymeric material based on tantalum oxide with a high refractive index and mechanically resistant to abrasion previously described,
- a layer with a low refractive index based, for example on colloids of silicon oxide, calcium fluoride or magnesium fluoride encased or not in a siloxane binder or silicon oxide in polymeric form.

Such a material will be rather a "narrow band" anti-glare material but with an extremely high performance and suitable particularly for applications in the spectacle trade.

If the anti-glare material comprises, in addition, applied onto the substrate below the layer of polymeric material based on tantalum oxide with a high refractive index, a layer with a medium refractive index (lower layer), formed preferably according to the invention, by a polymeric material based on tantalum oxide and another metal or metalloid oxide, preferably silicon oxide, one then obtains a "broad band" anti-glare material; the difference in band width existing between on the one hand, a "broad band" anti-glare material and on the other hand, a "narrow band" anti-glare material is generally about 50% or more.

The anti-glare material can also comprise, on the layer with a low refractive index, an anti-abrasive layer, produced preferably according to the invention and based on a fluoro-organosilane (fluorinated silane).

It should be noted on the one hand that in the case of an application on an organic support, it is necessary to use either a material that is not very deformable, that is to say with a low coefficient of thermal expansion, or a plastic support, previously coated with a lacquer, preferably a suitable organo-silane lacquer that permits densification or cross-linking of the layer based on tantalum without inducing stresses.

The structure of this material "with three layers" has been optimized in such a way that a maximum transmission optical response is obtained over a broad spectral range, that is to say, for example with a $\Delta\lambda$ of 300 nm and centered on 550 nm.

The refractive index formula to respond to this criterion is therefore—starting from the substrate : medium index/high index/low index. One then reduces the spectral reflection of the treated substrates, for example up to less than 1% between 400 and 750 nm and for example to less than 0.8% at 580 nm.

In addition, the presence of an anti-abrasive layer according to the invention, preferably based on a fluorinated silane, allow the anti-glare properties to be preserved while significantly increasing the resistance to abrasion.

In addition, the layer of fluorinated silane gives to the deposit an anti-adhesive and hydrophobic character that is particularly interesting since it facilitates the cleaning of the treated surface.

The anti-glare layers prepared in this way are homogeneous and free of crazing and/or internal cleavage planes. Consequently, the anti-glare film obtained is sufficiently elastic to tolerate weak torsion or deformation forces, when applied to a plastic substrate. Furthermore, this film resists a hot moist and saline atmosphere and leads to long life even after several successive immersions in boiling salt water (greater or equal to 10).

When it is applied to a glassy substrate, the broad band anti-glare coating according to the invention, for example with a band width of 300 nm, centered on 550 nm, prepared by a sol-gel method has remarkable mechanical strength properties and can therefore be applied in the context of use by the public at large for example by being applied to cathode tube screens for televisions.

Generally, the anti-glare material according to the invention, in effect and in a surprising manner, fulfils all of the demands required for such a use, namely:

- a spectral reflection less than 0.8% at 580 nm.
- a reflection less than 1% between 450 and 750 nm over the whole spectral width
- a minimum angular dependence of the reflection
- a mechanical strength defined by a resistance to severe abrasion in accordance to the US-MIL-C-0675-C standard, characterized by an absence of damage after 40 passes.
- a chemical resistance characterized by a resistance to current maintenance products, to acids, bases and to organic solvents (ethanol, acetone, etc,.).

In addition, as will be seen below, the method of preparation of the anti-glare material according to the invention, that does not involve high temperatures, is simple and inexpensive.

The invention also relates to a reflecting material, characterized in that it comprises an organic or inorganic substrate, covered by at least a sequence of two layers comprising:

- a layer with a low refractive index, analogous to that already mentioned above, formed, for example, by colloids of silicon oxide, calcium fluoride or magnesium fluoride encased or not with a siloxane or silicon oxide or magnesium oxide binder in polymeric form; and
- a polymeric layer based on tantalum oxide with a high refractive index and mechanically resistant to abrasion previously described;
- possibly an anti-abrasive layer.

The reflecting material obtained is a mono or polychroic passive dielectric mirror, that reflects wavelengths ranging from the near ultra-violet to the near infra-red.

The material based on tantalum oxide and with a high refractive index is particularly suitable for the production of interfering multi-layer mirrors. In effect, in order to obtain a given reflectivity, the number of layers necessary is a function of the ratio of refractive indices (in. the case of a reflecting stack of layers, a quarter of a wave with 2 refractive indices).

For the alternating deposition of a layer with a low refractive index (low index: $n_B$) and a layer with a high refractive index (high index: $n_H$), the number of layers required will be lower the greater the ratio ($n_H/n_B$). On the other hand, the spectral width is also a function of the difference between the two refractive indices.

Thanks to the use of the material based on tantalum oxide and with a high refractive index according to the invention, the number of layers necessary to obtain a given reflectivity is reduced, for example by a factor of 1.5 to 2 in relation to the use of a medium refractive index. This allows a reduction in the manufacturing period and the risks of contamination while the method of manufacturing the multi-layer mirror can be carried out at ambient temperature or at a moderate temperature less than or equal to 150° C. for example.

The reflecting material can also comprise a substrate covered with at least one layer with a low refractive index, already described above, and at least one layer with a medium refractive index analogous to that already described above for the anti-glare material, formed preferably, according to the invention, from a material based on tantalum oxide and another oxide of a metal or a metalloid, preferably silicon oxide or magnesium oxide.

The material obtained would then qualify as a "semi-reflecting material".

Similarly, by reversing the order of layers of the anti-glare materials described above, one also obtains reflecting or semi-reflecting materials.

The invention will be better understood on reading the following description of an embodiment of the invention, given by way of an illustrative example and being non-limitative.

BRIEF DESCRIPTION OF THE DRAWINGS

FIGS. 1a to 1c illustrate the method of manufacture and deposition of the polymeric material based on tantalum oxide, notably with a high refractive index and mechanically resistant to abrasion according to the invention.

Figure 1:
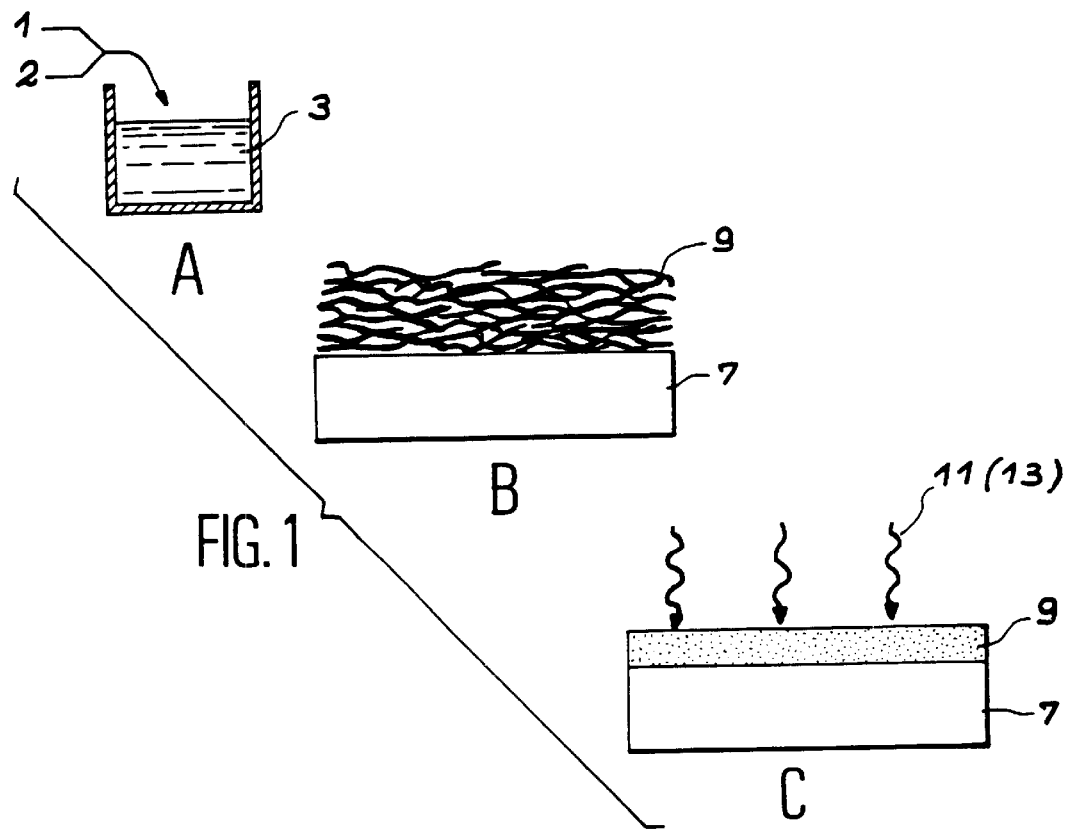
FIG. 1 illustrates the different steps of manufacturing the material previously mentioned.

The first step of the method consists of synthesizing a solution in a solvent containing a molecular precursor compound of tantalum capable of forming a homogeneous polymer film of tantalum oxy-hydroxide during the deposition by a hydrolysis-condensation reaction with the water vapor contained in the air.

This solution 1 is obtained according to the invention by dissolution of an anhydrous tantalum salt, preferably a tantalum pentahalide $TaX_5$ (with X=F, Br, Cl or I). More preferably, solution 1 is obtained by dissolution of tantalum pentachloride $TaCl_5$ in a solvent 3.

This solvent 3 is preferably chosen from among the saturated aliphatic alcohols of formula ROH where R represents an alkyl group, for example with 1 to 5 carbon atoms and more preferably, the solvent is absolute ethanol.

This mixture gives rise to the formation, in the case for example where the halogen is chlorine, of a tantalum chloro-alkoxide, according to the following equilibrium, as described by Pascal P., in Le Nouveau Traité de Chimie Minérale, Masson Ed. Paris, Vol. XII (1959), p. 576:

For example, for x=3, one has the following equilibrium:

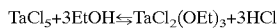

The reaction is slightly exothermic (increase in temperature up to about 50° C.). The solution 1 obtained after cooling and filtration is clear, transparent and very acid.

The method of this present application therefore fundamentally differs from the prior art where one uses, as a precursor, a metal alkoxide such as an alkoxide of tantalum, for example tantalum penta-ethoxide (Ta(OEt)$_5$ hydrolyzed in an acid medium of HCl or CH$_3$COOH. Such solutions gel relatively rapidly, within the space of about 2 to 3 days, and their stability is therefore clearly reduced compared with the solutions of chloro-alkoxide according to the invention.

Furthermore, the alkoxide solutions require a complexing agent and are in addition much more expensive than the solutions prepared for example from TaCl$_5$ which is a product easily available and of relatively low cost.

Solution 1 for example of tantalum chloro-alkoxide in ethanol called a TaCl$_5$/EtOH solution in the following description, generally has a concentration of from 1 to 20% expressed as an equivalent Ta$_2$O$_5$ mass. This solution is sensitive to the moisture in the air. If water is added, for example in a molar ratio H$_2$O/Ta of 10, it rapidly forms a gel, and because of this such a solution ought preferably to be protected from ambient humidity.

Although such a solution can be used in a totally satisfactory manner, and is clearly superior to the alkoxide solutions used until now for the reasons already given above, the excess of HCl present in the mixture leads however to two disadvantages.

Firstly, the acid vapors coming from the solution are corrosive in relation to surrounding metal objects. Then, the thermal cross-linking treatment carried out preferably, according to the invention, at low temperature, less than or equal for example to 150° C., does not allow one to remove the excess halide ions such as chloride ions from the deposited layer, which makes the surface of the coating relatively non-wetting and prevents good adhesion of the following layer.

Preferably one is seeking to remove the halide ions, in particular the chloride ions in excess in the solution or at the very least to restrict the excess in relation to the metal containing precursor.

The removal of the excess, for example the excess of hydrochloric acid (if X=Cl) can occur by evaporation that is to say that one removes the excess of hydrochloric acid and ethanol from the TaCl$_5$ mixture, by evaporation under reduced pressure, for example 10$^{-2}$ mbar. A white solid is obtained corresponding to TaCl$_2$(OEt)$_3$, the residue is then partially redissolved in the ethanol to give a solution for example of 5 to 10%, preferably to 7% in Ta$_2$O$_5$ mass equivalent. The dissolution is total, after for example a reflux of 4 hours at 80° C. After filtration of the mixture, a clear and transparent solution is obtained with a pH close to 2.

In the remainder of the description, this solution will be called TaCl$_2$(OEt)$_3$/EtOH.

It is obvious that what has just been described for X=Cl and R=Et can be generalized for any X and any group R quoted above.

The sensitivity of this solution to moisture is close to that of the TaCl$_5$/EtOH solution.

The second method to remove the excess chloride ions consists of neutralizing them, for example by causing them to precipitate in the form of ammonium chloride (NH$_4$Cl) by bubbling anhydrous gaseous ammonia (NH$_3$) into the TaCl$_5$/EtOH mixture for example of 5 to 10% in Ta$_2$O$_5$ mass equivalent. The formation of a white precipitate corresponding to ammonium chloride which is not very soluble in an alcoholic medium.

The reaction occurring is the following:

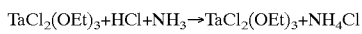

After filtering the mixture, a clear solution is obtained with a pH of about 6–7 measured in an ethanolic medium.

In the rest of the description, this solution will be called TaCl$_2$(OEt)$_3$/EtOH-NH$_3$.

Once again, it is obvious that what has just been described for X=Cl and R=Et can be generalized for any X and any group R quoted above.

This solution is not very sensitive to atmospheric humidity, but if for example water is added in a molar ratio H$_2$O/Ta close to 10, it will very rapidly form a gel.

A third route consists of reducing the proportion of chloride ions (or halide ions) in relation to the metal containing precursor in the solution, by adding another metal or metalloid compound that does not contain chloride ions, all the time keeping the optical and mechanical properties of the material after deposition, and thermal or some other cross-linking treatment.

Titanium oxide appears to be an excellent candidate despite its moderate mechanical strength after heat treatment for example at 150° C. but one can use it in a formulation, tantalum oxide providing the properties of resistance to abrasion of the material.

One can use from 1 to 99% for example, from 10 to 90% by mass expressed as oxide of the metal precursor component, not containing chloride ions and afterwards giving titanium oxide, but preferably the formulation used which allows one to obtain layers that coincide with the specifications for resistance to abrasion and refractive index corresponds to a final proportion less than or equal to 50% by mass expressed as titanium oxide.

In order to obtain such a system, titanium tetra-iso-propoxide (Ti(iOPr))$_4$ as precursor is added to the TaCl$_5$/EtOH solution, although one could also use another alkoxide of titanium or another precursor compound for titanium oxide. After filtration of the mixture, a clear and transparent solution (2) of pH<2 is obtained.

In the remainder of the description, this solution will be called TaCl$_5$—Ti(iOPr)$_4$/EtOH.

It is also possible, as already mentioned above, to prepare tantalum solutions (1) by using different metal salt solutions TaX$_5$ with X=F, Br, I apart from Cl dissolved in ethanol for example at a concentration of from 5% to 10% in Ta$_2$O$_5$ mass equivalent, so as to obtain less acid treatment solutions and to eliminate the problems of wettability of the deposited layer essentially associated with the presence of chloride.

In all cases, the proportion of the component that is a molecular precursor of tantalum is preferably from 5% to 10% in equivalent mass of tantalum oxide, in the solvent, such as the alcoholic solvent.

More generally, the solution (solution 1) can be mixed in a solvent—a solution in a solvent of the same nature comprising a compound of a metal or a metalloid other than tantalum, this precursor compound then giving a component based on an oxide of the metal or metalloid added, in a proportion ranging from 100 to 0% (preferably from 1 to 99% and more preferably from 10 to 90%) as metal or metalloid oxide equivalent for 0 to 100% as tantalum oxide equivalent.

The metal or metalloid other than tantalum is chosen preferably from among titanium (see above) yttrium, scandium, zirconium, hafnium, thorium, niobium, lanthanum or aluminum if one wishes to obtain a rather high index and from among silicon and magnesium if one wishes to obtain a rather medium or low index.

The metal or metalloid precursor compound can be chosen from among any suitable compound such as an alkoxide or some other.

One can also add the compound of a metal or metalloid other than tantalum directly to the solution of a molecular compound based on tantalum in order to obtain the desired concentration.

One can also mix several solutions made up of several compounds of a metal or a metalloid other than tantalum with the solution (1) or add several compounds of a metal or a metalloid other than tantalum directly to the solution.

In either case, a solution (2) is obtained of molecular precursors having, for example a concentration of from 5 to 10% as a mass equivalent of metal oxides, the proportions of equivalent metal oxide/tantalum oxide varying from 0/100 to 100/0.

As illustrated in FIG. 1b, the solution containing the molecular precursor of tantalum thus obtained (solution 1 or 2) is deposited onto a support 7 to give a polymeric oxy-hydroxide layer of tantalum with reference number 9.

One means by the general term "support 7", any organic or inorganic substrate such as those which will be later described or any active layer or layer encouraging adherence, deposited on said substrate.

Generally, the substrate is a flat substrate having a slight curvature, for example the surface of a screen of a cathode tube for a television or a spectacle lens, but the method according to the invention allows one to coat any substrate whatever its shape.

The deposition of the layer 9 is carried out, for example, by dip coating, by spin coating, by laminar flow coating, by tape coating or by any other method that allows one to obtain a uniform deposit and a layer of homogeneous thickness.

Finally, FIG. 1c illustrates the third step of the method consisting of carrying out cross-linking or densification, for example, by heat treatment or by UV exposure of layer 9.

These thermal or irradiation treatments are respectively given reference numbers 11 and 13.

Treatment 11 is carried out for example in an oven or under an infra-red lamp for example at a temperature of 100 to 200° C., preferably 120 to 200° C. and more preferably 150° C. for 2 to 150 minutes, preferably 15 to 60 minutes, for example at 150° C. for a period of 30 minutes.

Treatment 13 is carried out under a UV lamp, for example a mercury vapor lamp or excimer lamp emitting preferably in the UV-B and UV-C range that is to say a wavelength of 180 to 280 nm.

The UV dose received by the layer must be sufficient to induce cross-linking. The period of exposure to UV is a function of the emission power of the lamp within the range of wavelengths already mentioned.

Said exposure to ultra-violet rays is generally carried out with an energy of 5 to 10 J/cm$^2$, preferably from 5 to 6 J/cm$^2$, for a period of from 10 seconds to 10 minutes, preferably from 30 seconds to 5 minutes, for example 1 minute, being typically a power of 350 mW/cm$^2$.

Generally, the step of cross-linking by UV is followed by an annealing or post-thermal treatment at a temperature, for example of from 80 to 200° C., preferably from 100 to 150° C. for 10 to 60 minutes, preferably 15 to 30 minutes.

The cross-linking can also be carried out by any method known to a man skilled in the art in this field of technology and which allows the inorganic polymer to be cross-linked or densified according to the invention such as irradiation by a laser beam or by a beam of electrons or ions or micro-wave energy.

The densification by irradiation by ultraviolet rays improves the surface condition of the film and makes the layers much more wettable, particularly just after irradiation.

The densification-cross-linking treatment by irradiation by ultra-violet has in addition the important indeed decisive advantage of a treatment time that is significantly shorter than that of the heat treatment and this even if it must be followed by a step called thermal annealing which generally significantly improves the densification of the layer of $Ta_2O_5$.

By way of example, an irradiation under UV is carried out according to the invention for a period of a few minutes maximum, preferably a period equal to or less than 5 minutes instead of the 30 minutes at 150° C. generally required for a cross linking-densification by heat treatment.

Furthermore the cross linking-densification treatment using UV is easier to implement, requires less equipment and avoids the time required for raising and lowering the temperature.

The third step of the method which consists for example of these two treatments 11 and 13, allows the polymeric tantalum oxy-hydroxide network to cross-link and therefore the layer is densified. This treatment leads to better mechanical strength of the film and an increase in refractive index compared with an equivalent layer that has not been subjected to such a treatment.

Hence, in an unexpected manner, the method according to the invention brings together the advantages of both families of the sol-gel process without having the disadvantages in the sense that on the one hand, like the colloidal systems, it can be implemented at a moderate temperature but gives strong coatings and that on the other hand, in contrast to the polymer sol-gel systems, such a strength is obtained at low temperature.

According to the invention, and because the polymer material generally includes residual chloride (halide) ions, a densification by exposure to UV allows the wettability of layers based on this material to be improved.

The polymeric material prepared in this way, in the case of a polymeric material with a high refractive index, has precisely a "high" refractive index of for example from 1.86 to 1.95 notably (1.93 with solution 1 notably 1.86 with solution 2).

According to the invention, solution 1 or 2 can in addition, also be mixed with a compatible solution containing another metal or metalloid containing precursor of the alkoxide type or a metal salt dissolved, for example in a solvent or polymeric or colloidal materials, that allow the refractive index of the polymer layer obtained after deposition to be modulated at will, while preserving the properties of mechanical resistance to abrasion, the metal or metalloid thereby added being preferably different from the metal(s) and/or metalloid(s) already present in solution (1) or (2); this metal or metalloid can preferably be chosen from among the metals and metalloids already mentioned above.

Table 1 below gives, by way of a comparative example, the different refractive index values after densification, for certain of the materials that can be used in the invention, when, for example, solution 1 or 2 is mixed with tetraethoxy-orthosilicate which is a precursor of $SiO_2$, in relative proportions of tantalum oxide and silicon oxide equivalents.

TABLE 1

| PROPORTION IN $Ta_2O_5/SiO_2$ EQUIVALENTS | REFRACTIVE INDEX |
|---|---|
| 0/100 | 1.45 |
| 20/80 | 1.46 |
| 51/49 | 1.59 |
| 57/43 | 1.62 |
| 80/20 | 1.73 |
| 85/15 | 1.78 |
| 100/0 | 1.93 |

It is therefore possible to modulate the refractive index of this polymer system based on tantalum oxide and silicon oxide in a continuous fashion between 1.45 and 1.93 by varying the proportions of the constituents in the mixture.

To modulate the refractive index, one can also use any other oxide other than silicon oxide in the proportions mentioned above, by using the appropriate precursor. For this, magnesium oxide could be mentioned.

The refractive index of the layer based on tantalum oxide can also be increased up to 2.04 after densification by adding a solution containing a precursor based, for example, on titanium to solution 1, at the same time preserving the good mechanical properties of resistance to abrasion. Such a possibility has already been mentioned above. However, the use of the composite based on $TiO_2$ must be reserved preferably for uses other than power lasers. In effect, this oxide has an intrinsic absorption for light energy which restricts and limits its qualities in a laser flux to low values. This polymer material ($Ta_2O_5/TiO_2$) is, on the other hand, ideal for other applications, for example in integrated optics or for semi-reflecting sheets on plastic, since if it is associated with colloidal silica, it forms a couple of very high refractive index ratio, for example 1.67.

The optical material having optical properties according to the invention comprises at least one layer of polymeric material based on tantalum oxide, notably with a high or medium refractive index and is mechanically resistant to abrasion such as that previously described.

Several particular embodiment examples of these optical materials are described below. However, in a wider sense, the invention covers all optical materials comprising, not only a later of polymeric material based on tantalum oxide, notably with a high or medium refractive index and which is mechanically resistant to abrasion, but also any combination of optical layers whatsoever.

As a function of the nature of the optical layers, their thickness and their arrangement, one with respect to the other, anti-glare or reflecting materials will be produced.

Generally, the thickness of the layers, called "thin layers" is from 0.1 to 10 $\mu$m.

Figure 2:
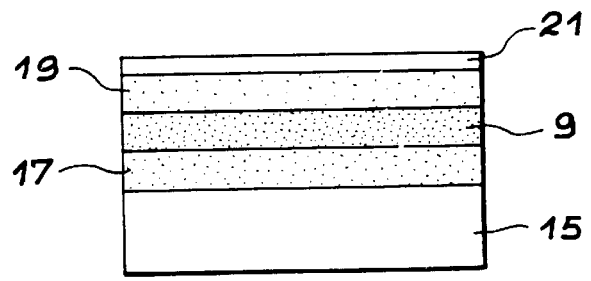
FIG. 2 is a section view of the anti-glare material according to the invention.

FIG. 2 illustrates an example of application of a polymer material based on tantalum oxide, with a high refractive index, in the manufacture of an anti-glare material with a broad spectral band, having good hydrophobic properties and good mechanical resistance to abrasion.

According to the characteristics of the invention, this material comprises successively:

a substrate 15 of the organic or inorganic type (refractive index $n_s$), a layer 17 or M with medium refractive index, of a material based on tantalum oxide and silicon oxide, a layer 9 or H with a high refractive index $n_H$, composed of the polymeric material based on tantalum oxide previously described, a layer 19 or B with a low refractive index $n_B$, formed for example from colloids of silicon oxide, calcium fluoride or magnesium fluoride and a siloxane or silicon oxide binder in polymeric form, and preferably, an anti-abrasive layer 21 based on fluorinated silane.

According to the invention, the thin layers above are generally prepared from polymeric sol-gel systems, densified-cross-linked at a moderate temperature, generally less than or equal to 150° C., and which have, in a surprising manner, excellent mechanical strength.

Furthermore, such a multi-component coating can be prepared rapidly and applied to any substrate, even plastic.

The layers B, H and M have respectively indices $n_B$, $n_H$ and $n_M$ with $n_B < n_M < n_H$. The total transmission of the system depends on the difference $\Delta n = n_H - n_B$.

This will be closer to 100% the bigger the value of $\Delta n$. The index of the layer M has an influence, above all on the shape and the width of the reflection curve.

The terms low, medium and high refractive index must generally be interpreted respectively as signifying that the index is less than about 1.5, between about 1.5 and 1.8 and greater than about 1.8, while the substrate has, for example an index between about 1.45 and 1.60.

In the remainder of the description, the term "organic substrate" designates more precisely, a plastic substrate, for example one chosen from among the polyacrylates, polycarbonates, polyallylcarbonates and polyamides. However, this list is not restrictive and covers in a more general way the organic polymer materials.

The term "inorganic substrate" covers more precisely a mineral substrate, that is to say, for example, amorphous or even crystalline materials and notably silica, the borosilicate or sodium-calcium glasses, the fluorophosphates and the phosphates.

Compared with mineral substrates, the plastic substrates are above all less expensive, more easily modulated, lighter and less fragile to impacts. However their use necessitates, preferably the presence of a layer interleaved between the organic substrate and the first deposited layer (17 in this case), providing good compatibility at this interface during the densification step and, in particular absorption of the induced stresses. According to the invention, this interfacial layer, or lacquer is preferably chosen from among the organo-silane polymers, possibly filled with mineral colloids.

The layer of medium refractive index is, according to the invention, preferably based on tantalum and silicon oxide as has already been mentioned above in Table 1.

Such a layer allow one to provide a chemical lattice having high continuity and thus able to create strong interactions between the thin layers deposited. The mixed $Ta_2O_5$—$SiO_2$ systems can give a medium refractive index and good mechanical strength.

There are two synthesis possibilities for the $Ta_2O_5$—$SiO_2$ systems from a solution of $TaCl_5/EtOH$: either by addition of a solution of polymeric silica, previously prepared, or by addition of TEOS, that is to say $Si(OEt)_4$. In this latter case, the life of the mixture is increased.

In these cases, the mixtures give clear solutions. The precursor of tantalum can also be introduced in the form of $Ta(OEt)_5$ or $TaCl_2(OEt)_3/EtOH$—$NH_3$.

The refractive index of the oxide system $Ta_2O_5$—$SiO2$ can, as has already been stated above (Table 1) be modulated from 1.45 to 1.93 after the cross-linking treatment such as a thermal cross-linking treatment, by varying the proportion of each constituent with, preferably, the mixture $TaCl_5$—$Si(OEt)_4/EtOH$ as precursor.

For the same reasons as for the layer developed with the TaCl$_5$/EtOH solution, the Ta$_2$O$_5$/SiO$_2$ layer prepared from the TaCl$_5$—Si(OEt)$_4$/EtOH mixture is non-wetting after heat treatment, for example at 150° C. for 30 minutes. However, as this medium index layer is covered by the Ta$_2$O$_5$ layer, the chemical nature of which is very close, the wettability properties of the Ta$_2$O$_5$—SiO$_2$ coating have little effect on the interactions between layers, the continuity of the chemical lattice being ensured.

The layer with high refractive index has already been described in detail above and will not therefore be again described in a detailed manner.

The layer with low refractive index is also prepared using the sol-gel technique. In the traditional way, this layer is the product of a mono-dispersed suspension of colloids of about 100 to 200 Å diameter, chosen preferably from among silicon oxide, calcium fluoride or magnesium fluoride and encased in a soluble polymeric siloxane binder. The colloids and the binder are synthesized from a molecular precursor. In the invention, tetraethyl orthosilicate is preferred as the molecular precursor of silicon oxide. However, one may also use tetramethyl orthosilicate or other alkoxides of silicon. For calcium fluoride or magnesium fluoride, respectively calcium acetate and magnesium methoxide will be used as precursors.

Preferably however, this layer comprises by mass from about 25 to 30% of silica colloids and from about 75 to 70% of siloxane binder. It is also possible to add a non-ionic surfactant such as alkylphenoxy-polyethoxyethanol to this layer. This allows one to increase the wettability of said deposit.

Preferably however, the layer f material with a low index is formed from silicon oxide or magnesium oxide in polymeric form (polymeric silica).

The treatment solution used to obtain a thin layer of polymeric silica is obtained preferably by hydrolysis-condensation of tetraethyl orthosilicate (TEOS, Si(OEt)$_4$) in an HCl or HNO$_3$ acid medium. This gives rise to the formation of an oligomeric species according to the reaction:

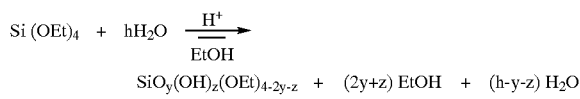

This solution is unstable and changes over time since the hydrolysis and condensation reactions forming the silicate lattice are relatively slow in the case of silicon.

The optical, mechanical and chemical properties of the thin layer of polymeric silica depend strictly on these physical and chemical parameters.

By way of example, and after optimization, the following preparation conditions are obtained:

A mother solution of polymeric silica is prepared with SiO$_2$ at 10.6% by mass in ethanol, that is to say h=10 and the pH is about 2.

After 4 hours magnetic stirring and about 3 to 4 weeks of aging at rest and at ambient temperature, the mother solution is diluted with about 4% pure ethanol, for example 3.75% by mass, which slows down and stabilizes the formation of the silicate lattice. The solution obtained is clear and transparent. It remains stable for 12 months at least, while the mother solution gels after a period of one month.

The thin layers of polymeric silica have a refractive index at 550 nm before and after cross-linking, for example by heating, close to 1.40.

The thin layers of polymeric silica have excellent abrasion resistance properties and are resistant to the usual organic solvents : alcohols, acetone, weak acids and bases (except hydrofluoric acid).

The surface of the polymeric silica layer has good wettability properties to both water and ethanol.

Although the resistance to mechanical and chemical attack of the anti-glare coating according to the invention is already excellent, in order to reinforce the chemical and mechanical properties of the ant-glare stack, a thin, hydrophobic, anti-abrasive film with a low coefficient of friction is used according to the invention to protect the layer with a low refractive index.

The use of a hydrophobic agent such as Teflon® does not give satisfaction since the interactions between the protective layer and, in particular, a top layer of polymeric silica, are slight, making the assembly weak to abrasion. The fluorinated silane compounds have the advantage of forming a chemical bond since they contain groups capable of reacting with the hydroxyl groups situated at the surface of the layer of polymeric silica, and a long fluorinated chain ensures the hydrophobic character and the low coefficient of friction of the deposit.

Among existing products C$_6$F$_{13}$CH$_2$CH$_2$—Si (OEt)$_3$ ((tridecafluoro-1,2,2,2-tetrahydro-octyl)-1-triethoxysilane) known under the name of T2494 from ABCR or C$_6$F$_{13}$CH$_2$CH$_2$—SiCl$_3$ ((tridecafluoro-1,2,2,2-tetrahydro-octyl)-1-trichlorosilane) known under the name T2492 from ABCR have been chosen.

These derivatives have a low refractive index, namely about 1.4 and are soluble in certain perfluorinated compounds such as GALDEN HT110® from the company MONTEDISON.

The "T2494" polymeric silica system obtained is inert to strong acids and strong bases and to the usual organic solvents. The layer is perfectly hydrophobic and is very poorly wetted by ethanol. It resists the "severe" test of military standard US-MIL-C-0675C and can be very easily cleaned.

Because of the very small thickness (for example a few nanometers, that is to say about ten nm), the hydrophobic layer does not interfere with the optical properties of the layer with a small index, for example the layer of polymeric silica.

The method of deposition of successive layers of the anti-glare material will now be described for the case of a thermal cross-linking, densification treatment.

In an advantageous though non-mandatory way, one proceeds firstly with a careful cleaning-scouring of the substrate, for example using a solution of hydrofluoric acid diluted to 1% and then the substrate is rinsed thoroughly with de-ionized water. It is then degreased with optical soap, rinsed once again with distilled water and dried with ethanol.

Such a cleaning step last for example for about 5 minutes.

The following step consists of applying to the cleaned substrate, the layer with a medium refractive index, for example, from a solution of precursor giving a layer of Ta$_2$O$_5$—SiO$_2$ in particular a TaCl$_5$—Si(OEt)$_4$/EtOH solution, for example in the respective proportions of 80/20 expressed as oxide.

This layer is applied uniformly onto the substrate, for example by dip coating, or by spin coating at a speed of about 10 cm/min to about 1000 rpm, or by laminar flow coating. The last two methods are preferable since they only require a very small amount of treatment solution. However one may also use other deposition techniques. This type of solution deposition has the advantage of allowing the coating of relatively large surfaces with treatment solutions that are very pure and are of low viscosity.

This deposition is followed possibly (that is to say that this step can be omitted) by a thermal cross-linking or densification step by heating under the conditions already mentioned above, preferably at a temperature of 150° C. and for a period of 30 minutes. The heating can be carried out in any suitable apparatus such as an oven etc. and the method of heating can be any method of heating suitable for such a purpose: for example infra-red heating etc.

A cleaning and scouring is then carried out in the same way as before and then one proceeds to the deposition of the layer with a high refractive index which can be prepared from either one of the solutions (1) or (2) of the $Ta_2O_5$ precursor, already described above, preferably with a $TaCl_2(OEt)_3$/EtOH—$NH_3$ solution. One then possibly proceeds to the heating (cross-linking/densification) of this layer in the same manner as previously.

One proceeds in the same way as that described above with another cleaning-scouring of the deposited layer and then the deposition of the layer with low refractive index is carried out from, for example, a solution of polymeric silica or any other solution containing a suitable precursor for a such a layer at a concentration preferably of from 2 to 5% oxide $SiO_2$.

One then proceeds possibly to the cross-linking or densification heat treatment of the layer, for example of polymeric silica thereby obtained, under the same conditions as previously.

Then preferably by spraying, one applies to the last low index layer applied, a hydrophobic agent, preferably of the fluorinated silane type such as that described above, for example the compound T2494. The hydrophobic agent is generally diluted in a perfluorinated solvent such as GALDEN HT110® from MONTEDISON at, for example to 2% by mass and applied hot at a temperature generally close to 100° C., preferably by spraying.

One then carries out a final heat treatment, preferably at a temperature of 150° C. and for a period of 15 minutes, following which, the excess of the hydrophobic agent such as T2494 is eliminated, for example, with a cloth impregnated with ethanol.

The anti-glare material according to the invention, prepared by a low temperature treatment, in a surprising manner, satisfies all the demands mentioned above associated with its optical properties and its mechanical strength and chemical resistance.

According to a first variant of the method according to the invention, following the deposition of the layer with a high refractive index based on $Ta_2O_5$, and the heating of the layer, a cleaning-scouring of this layer is carried out as already described and then one allows a certain period of time, for example 1 to 24 hours, preferably 12 hours, to pass before carrying out a second scouring of the $Ta_2O_5$ based layer and depositing the layer with a low refractive index, for example a polymeric silica layer.

According to a second variant of the method according to the invention, the layer with a high refractive index is deposited and then after this deposition, the deposited layer is rinsed with a mixture of ammonia (for example at 28% in water) and ethanol, preferably 50/50 by mass proportion, for a period of 1 to 20 minutes, preferably 5 minutes, the ethanol playing the role of ensuring a better wettability of the mixture. One then carries out a heat treatment at a temperature of from 100 to 200° C., preferably 150° C. for a period of, for example 1 to 15 minutes, preferably 5 minutes under reduced pressure, for example, from $10^{-1}$ to $10^{-3}$ mbar, preferably $10^{-2}$ mbar.

This treatment of rinsing and then heating is preferably repeated two to 10 times, for example, two times and then a rinsing with $NH_4OH$/ethanol is carried out again and finally the layer with a high index is heated and one proceeds with the deposition of the layer of low index and the other steps as described above.

According to a third variant of the method according to the invention, one proceeds in a way analogous to the second variant, but in a similar way to the first variant. A certain period of time, for example from 1 to 24 hours, preferably 12 hours, is allowed to pass following the second rinsing with the ammonia/ethanol mixture and before carrying out the deposition of the layer with a low index and the other steps of the method.

This third variant of the method of densification-cross linking of the layer of high index based on $Ta_2O_5$ namely a heat treatment under reduced pressure and rinsing with a $NH_4OH$/ethanol mixture gives better results with regard to the adhesion of the layers and to the mechanical properties of resistance to abrasion of the anti-glare coating.

A coating prepared with the third variant of the method goes beyond the demands required for applications relating to the public at large.

The method of depositing successive layers of an anti-glare material will now be described in the case of cross linking-densification by exposure to UV rays.

The method above which necessitates a step of thermal densification of the high index layer at moderate temperature, although it enables one to provide a highly satisfactory anti-glare coating, resistant in particular to the "severe" abrasion test from the standard US-MIL-C-0675-C, nevertheless has the disadvantage of taking a relatively long time and requiring numerous pieces of apparatus such as a vacuum oven, rinsing bath etc,. and of being relatively expensive with respect to energy since it involves notably four heat treatments at 150° C.

As has already been mentioned above, densification by exposure to ultra-violet radiation allows one to produce a well densified "high index" layer based on $Ta_2O_5$, for example with n=1.83 instead of 1.93 in a short time, a layer that is wettable on leaving the lamp. At the same time, the increase in temperature is slight, being, for example about 70° C. at the level of the substrate.

Such a UV densification-cross linking treatment possibly associated with a thermal annealing can also be applied to the medium index layer and to the low index layer, for example prepared from polymeric $SiO_2$.

In the same way as for the thermal densification-cross linking treatment, one first carries out a careful cleaning-scouring treatment of the substrate using, for example a 1% solution of hydrofluoric acid and then rinsing thoroughly with de-ionized water.

The substrate is then degreased with optical soap, rinsed again with distilled water and dried with ethanol, such a cleaning step taking for example 5 minutes.

The following step consists of applying to the cleaned substrate, the layer with a medium refractive index, for example, from a solution of precursor giving a layer of $Ta_2O_5$—$SiO_2$ in particular a $TaCl_5$—$Si(OEt)_4$/EtOH solution, for example in the respective proportions of 80/20 expressed as oxide. This layer is applied uniformly onto the substrate by one of the techniques already mentioned above in the context of the method of deposition with a thermal densification-cross linking treatment.

One then proceeds possibly (that is to say that this step can be omitted) to the densification/cross linking of this layer by exposure to UV rays, for example UV B or C, preferably at an energy of from 5 to 10 $J/cm^2$, more preferably from 5 to 6 $J/cm^2$ for a period preferably of from 10 seconds to 10 minutes, more preferably from 30 seconds to 5 minutes, for example 1 minute (being a power of from 300 to 350 mW /cm$^2$)

Preferably, one operates at full power, that is to say at 350 mW/cm$^2$.

After cooling of the substrate which does not take more than 1 to 5 minutes, using, for example a jet of air under pressure, the high index layer based on $Ta_2O_5$ is deposited which can be prepared from either one of the $Ta_2O_5$ precursor solutions (1, 2) already described above. Then one proceeds possibly to the densification-cross linking of this layer by exposure to ultra-violet radiation under the same conditions as for the layer with a medium index.

One then carries out the deposition of the low index layer, for example a layer of polymeric $SiO_2$, from a suitable solution, for example one of the treatment solutions already mentioned above, that is to say, an ethanolic solution of polymeric silica obtained from $Si(OEt)_4$ in a HCl or $HNO_3$ medium or from a solution such that $[SiO_2]$=2.4%, $[H_2O/Si]_{mol}$=12 and pH≈2, in a nitric or hydrochloric acid medium and without exposure to UV that is called oligomeric silica, the preparation of which results from the modification of the method described by MAEKAWA S. and OHISHI T., J. of Non-crystalline Solids, 169, (1994), p. 207.

One then proceeds to the densification-cross linking of this layer by exposure to UV radiation, but the layer with low refractive index is exposed to a reduced energy and/or for a reduced period of time, for example 30 seconds, since the effects of the UV on the densification of this layer are more limited than in the cases of the high index and medium index layers.

One takes advantage of the heating of the surface of the coating to apply the hydrophobic agent such as T2494 hot, in the manner already described.

The whole assembly of substrate and the three applied layers is then subjected to a heat treatment or annealing treatment at a temperature of, for example 80 to 200° C., preferably 100 to 150° C. for 10 to 60 minutes, preferably from 15 to 30 minutes, for example at 150° C. for 30 minutes so as to progress the densification of the three layers as much as possible.

The anti-glare coating obtained has excellent optical and mechanical properties and excellent resistance to abrasion.

The total period of time taken for the method is, for example about one hour.

The method according to the invention for the manual preparation of such an anti-glare coating with densification-cross linking by exposure to UV radiation is particularly well suited to the treatment of an organic substrate, for example, a plastic substrate that does not tolerate the high temperature of heat treatments.

Such a method also allows one to produce broad band anti-glare coatings which are resistant to abrasion, notably for the screens of cathode tubes, and meeting all the demands mentioned above.

UV densification allows one to notably reduce the manufacturing time of the three layer coating by reducing the number of heat treatments, for example at 150° C. from 4 to 1, the thermal inertia of the voluminous substrate practically tripling the treatment times.

Furthermore, UV densification, by making the surfaces wettable immediately after exposure does away with the intermediate cleaning steps, and provides good interaction between the layers and improves the mechanical resistance to abrasion of the coating, in particular, if the layer of polymeric silica comes from a "MAEKAWA type" preparation, also called "oligomeric silica".

Finally, the heating of the surface engendered by UV permits the hot deposition of the hydrophobic agent before the single final heat treatment of the three layers and hence reinforces at little cost the mechanical strength of the coating; this method of densification therefore appears to be relatively more simple to implement in an industrial way than the series of heat treatments previously proposed.

Figure 4:
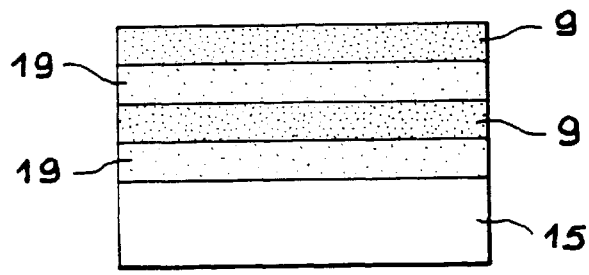
FIG. 4 is a section view of the reflecting material according to the invention.

FIG. 4 illustrates a second example of an optical material, namely a reflecting material with a broad spectral band.

According to the characteristics of the invention, this material comprises a substrate 15 of an organic or inorganic nature, onto which is deposited at least one group (sequence) of two layers, in the case of FIG. 4, two groups of two layers, namely a layer 19 with a small refractive index; and a layer 9 with a high refractive index.

The substrate 15 and the layers 19 and 9 are identical to those described in the production of the anti-glare material.

The method of depositing successive layers of reflecting material will now be described making reference to FIG. 4.

In an advantageous but optional way, the substrate of organic or inorganic nature is firstly subjected to meticulous cleaning, such as that described in the production of the anti-glare material.

One then deposits onto the cleaned substrate 15, a first layer 19 with a low refractive index according to one of the solution deposition techniques already mentioned. The solvent is advantageously chosen from among the aliphatic alcohols.

One then proceeds to the cross-linking of this layer either by UV or by a heat treatment under the conditions already mentioned for the anti-glare coating.

One then caries out a cleaning-scouring of this layer, in a known manner, for example with an HF solution at 1%. The treatment can be omitted if one carries out the densification-cross linking by exposure to UV.

One then proceeds to the deposition of the layer 9 with a high refractive index and once again the densification is carried out by UV or by a heat treatment.

Then, the deposition operations already mentioned are repeated as many times as necessary to achieve the desired reflectivity.

In the case where the cross linking is carried out by UV, preferably the whole of the stack is subjected to heating or thermal annealing under the conditions analogous to those used for the anti-glare coating.

The strength of the coating can then be improved by the deposition of a hydrophobic anti-abrasive layer, analogous to that already described in the case of the anti-glare material above. This layer completes the stack and is applied hot in the same way as for the anti-glare coating, for example, by spraying.

Below, examples are given of the production of materials according to the invention or of the implementation of the method according to the invention.

The deposition operations are carried out preferably in a class 100 clean environment (US standard) and by laminar flow coating.

EXAMPLE 1

Production of thin layers based on tantalum oxide with cross linking by heat treatment.

The silica substrate of 5 cm diameter (refractive index 1.45) is first cleaned using a solution of hydrofluoric acid 1% and then rinsing thoroughly with water.

It is then degreased with optical vegetable soap "Green soap", rinsed once again with distilled water and dried with ethanol.

Just before deposition, the substrate is subjected to a "drag-wipe" so as to remove dust and the last traces from the evaporation of the alcohol.

It should be made clear that the wiping operation known in English as "drag-wipe" consists of passing over the surface to be treated an optical paper, partially soaked in ethanol in its front part, but dry in its back part. In this way, the surface is firstly moistened and then dried immediately afterwards.

The depositions were carried out by spinning with about 1.5 ml of treatment solution. The mean duration of the spreading operation is of the order of 3 to 4 seconds. The speed of rotation of the substrate is between 1000 and 2000 rpm depending on the concentration of tantalum in solution and the type of precursor used. After two minutes of drying at 25° C., a homogeneous tantalum layer is obtained.

a) Effect of the Heat Treatment

The results relating to the influence of the temperature and the duration of the heating are provided by deposits produced with a $TaCl_5$/EtOH solution at a concentration of 7% in equivalent $Ta_2O_5$ mass.

The speed of rotation of the substrate is fixed at 1750 rpm. After two minutes drying at 25° C., the deposited layer has an index of 1.63 and a thickness of 131 nm. The maximum reflection is at 850 nm (quarter wave peak).

The maximum value of n is equal to 1.95 at 150° C.

b) Effect of the Tantalum Precursor

The refractive index n (at 550 nm) and the necking coefficient Δe for the thin layers obtained with the various treatment solutions described above; namely $TaCl_3$/EtOH, $TaCl_2(OEt)_3$/EtOH, $TaCl_2(OEt)_3$/EtOH—$NH_3$, and $TaCl_5$—$Ti(Opr^1)_4$/EtOH(50/50) after heat treatment at 150° C. for 30 minutes are given in Table II

TABLE II

Refractive index n at 550 nm and necking coefficient

| Treatment solution | Refractive index (at 550 nm) Before heating | After heating | Necking coefficient Δe |
|---|---|---|---|
| $TaCl_3$/EtOH | 1.63 | 1.93 | 52% |
| $TaCl_2(OEt)_3$/EtOH | 1.61 | 1.93 | 52% |
| $TaCl_2(OEt)_3$/EtOH—$NH_3$ | 1.59 | 1.86 | 56% |
| $TaCl_5$—$Ti(Opr^1)_4$/EtOH (50/50) | 1.67 | 2.01 | 45% | c) Mechanical and Chemical Properties of the Layers and Surface Condition

From the point of view of their chemical and mechanical properties, the layers according to the invention based on $Ta_2O_5$ after heat treatment are remarkable whatever the type of molecular precursor used. In effect, they are extremely resistant to abrasion and withstand the "severe" test from the US military standard US MIL-C-0675C that is to say 20 return passes with a pressure of 2.5 lb. without damage.

Furthermore, they are not harmed by the following chemical products:

organic solvents (alcohols, acetone.)
strong acids (HCl 12M, HF 10%, pure acetic acid etc.)
strong bases (NaOH SM, ammonia solution at 28%, TMAOH 1M etc.)

EXAMPLE 2

Production of thin layers in the binary oxide system $Ta_2O_5$—$SiO_2$ $Ta_2O_5$—$SiO_2$ systems are prepared from a $TaCl_5$/EtOH solution at 7% mass equivalent $Ta_2O_5$ to which is added either a solution of polymeric silica previously prepared (5% by mass in ethanol, hydrolysis acid (HCl) at pH 2, h=$H_2O$ concentration/Si concentration=8)and aged for one month, or TEOS (Si (OEt)$_4$). One can also vary the respective masses of $Ta_2O5$ and $SiO_2$ as one wishes.

The silica substrate of 5 cm diameter (refractive index 1.45) is firstly cleaned with a 1% solution of hydrofluoric acid, then rinsed thoroughly with water. It is then degreased with optical soap "green soap", rinsed again with distilled water and dried with ethanol. Just before the deposition, the substrate is subjected to a "drag-wipe" so as to remove the dust and the last traces stemming from the evaporation of the alcohol.

The depositions were carried out by spin coating with about 1.5 ml of treatment solution. The mean period of deposition is of the order of 3 to 4 seconds.

The speed of rotation of the substrate is between 1000 and 2000 rpm depending on the concentration of tantalum and silica in the solution and the type of silicon containing precursor used. After two minutes of drying at 25° C., a homogeneous layer based on tantalum and silica is obtained.

The indices n, the necking coefficient Δe and the resistance to abrasion test correspond to the properties measured after thermal treatment at 150° C. for 30 minutes.

It is clearly apparent that it is possible to modulate the index of the binary $Ta_2O_5$—$SiO_2$ system from 1.46 to 1.93 by varying the proportion of each constituent with the $TaCl_5$—$Si(OEt)_4$/EtOH mixture. From the point of view of mechanical properties, it should be remarked that It is preferable to have a certain proportion of $Ta_2O_5$ (of the order of 55% by mass) so that the layer of $Ta_2O_5$—$SiO_2$ is resistant to severe abrasion in accordance with the standard US-MIL-C-675C.

The $TaCl_5$—$Si(OEt)_4$/EtOH mixture appears to be more stable as regards its life with mass ratios $Ta_2O_5$/$SiO_2$>20/80.

EXAMPLE 3

Production of an anti-glare material with cross-linking by heat treatment:

In this example, a three layered anti-glare coating based on tantalum oxide and polymeric silica has been produced, which has been applied on both faces of a circular sheet made of silica which has a mean index of 1.45 in the visible.

The formulation of the three layered optical film that we have chosen is as follows:
One layer of $Ta_2O_5$—$SiO_2$ (80/20) of index $n_M$=1.73 quarter wave at 550 nm produced from a solution of TEOS—$TaCl_5$/EtOH (e=79 nm).
One layer of $Ta_2O_5$ of index $n_H$=1.93 quarter wave at 550 nm produced from a solution of $TaCl_5$/EtOH (e=71 nm).
One layer of polymeric $SiO_2$ of index $n_B$=1.42 quarter wave at 550 nm (e=97 nm).
An anti-abrasive protective layer.

Procedure

The depositions of each optical layer are repeated on the other face of the substrate before they are heated.

The preparation of each layer comprises a sequence cleaning, deposition, heating at 150° C., for a period respectively of 5 minutes, 2 minutes and 30 minutes, except for the deposition of the anti-abrasive hydrophobic agent where the process is just one of deposition and heating for a period of 15 minutes.

The total time taken for the treatment is about 2 hours and 30 minutes.

The layer of $Ta_2O_5$—$SiO_2$ (80/20) was deposited by spin coating at a speed of rotation of 2700 rpm, from a solution of $TaCl_5$—$Si(OEt)_4$/EtOH at 8.5% by mass of the equivalent oxide mixture.

The layer of $Ta_2O_5$ was produced by spin coating at a speed of rotation of 1100 rpm with a $TaCl_5$/EtOH solution at 7% by mass of oxide.

The layer of polymeric $SiO_2$ was deposited by spin coating at a speed of rotation of 2800 rpm with a solution at 3.75% by mass of oxide, aged for 15 days.

Each layer was subjected to a heat treatment of 30 minutes at 150° C. After each heating of the layers based on $Ta_2O5$, the coating is scoured with a hydrofluoric acid solution at 1% with the purpose of removing the chloride ions situated at the surface and making the layer wettable for the following deposition.

After the heating of the polymeric silica layer, the hydrophobic agent T2494 diluted in GALDEN HT110® (from MONTEDISON) to 2% by mass, is deposited on the hot sheet that has a temperature of about 100° C., by spraying.

After thermal treatment at 150° C. for 15 minutes, the excess of T2494 is removed with the help of a cloth impregnated with ethanol.

Figure 3:
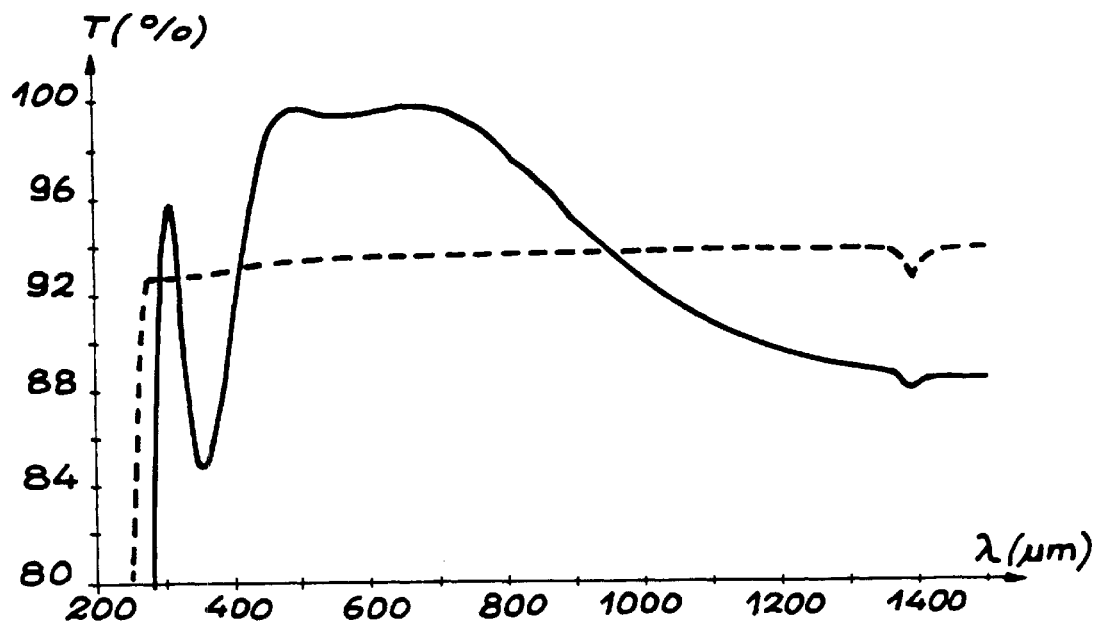
FIG. 3 is a graph representing the value of the transmission (T), as a function of the wavelength (λ) in nm for a bare silica substrate and for an anti-glare material according to the invention.

Optical properties of the anti-glare material prepared in accordance with example 3 above:

FIG. 3 gives the value of the transmission (%), as a function of the wavelength (λ) for a bare silica substrate and for the anti-glare material according to the invention, prepared in conformity with example 3.

Chemical and mechanical properties of the anti-glare material prepared in accordance with example 3 above:

The anti-glare coating is inert to the strong acids 12M HCl, 1% HF, pure acetic acid, to strong bases 5M NaOH, 28% ammonia solution, 1M TMAOH, and to organic solvents, alcohols and acetone.

It has excellent hydrophobic properties, since the angle of contact with a drop of water is greater than 90° and it is not very well wetted by ethanol.

The anti-glare coating resists laboratory rubber and the tearing off of an adhesive strip. It is not damaged by the "moderate" test of the standard US-MIL-C-0675C, that is to say 50 passes with a pressure of 1 lb. In contrast, scratches appeared after 10 passes in the "severe" test (a pressure of 2.5 lb.) and the observations with an optical microscope show a delamination of the layer of polymeric silica.

EXAMPLE 4

Production of thin layers of medium index in the $Ta_2O_5$—$SiO_2$ (80/20) system with densification by UV irradiation:

A $Ta_2O_5$—$SiO_2$ (80/20) layer of medium index is prepared by carrying out the deposition with a $TaCl_5$—$Si(OEt)_4$/EtOH solution at 8.75% by mass of total oxide.

The speed of rotation of the substrate is fixed at 2180 rpm. After two minutes of drying, the deposited layer has an index of 1.545 and a thickness of 163 nm. The maximum reflection is at 1005 nm before densification (quarter wave peak). The change in the refractive index n and the thickness of the layer e are both functions of the number of passes under the UV.

The values of n and of Δe, achieved after 75 passes, n=1.64, Δe=31.78% are close to about 90% of those obtained after heat treatment at 150° C. for 30 minutes. The resistance to abrasion properties are slightly lower: slight cracking is apparent at the surface of the layer in the "severe" test from the military standard US-MIL-C-0576-C (40 passes).

The great difference between the two methods of densification by UV or by heat treatment is in the surface condition of the film: UV densification has the advantage of giving a layer of $Ta_2O_5$—$SiO_2$ (80/20) that is completely wettable immediately after irradiation which is not the case with the heat treatment.

The properties of resistance to abrasion are improved with thermal annealing of the $Ta_2O_5$—$SiO_2$ (80/20) layer of medium index which then passes the "severe" test from the military standard US-MIL-C-0576-C.

EXAMPLE 5

Production of thin $Ta_2O_5$ layers of high index with densification by UV irradiation:

A high index layer of $Ta_2O_5$ is prepared by carrying out the deposition with three type of treatment solutions:

$TaCl_5$/EtOH (7.0% by mass of oxide), $TaCl_2(OEt)_3$/EtOH (at 6.5%) and $TaCl_2(OEt)_3$/EtOH—$NH_3$ (at 7.6%).

The speeds of rotation of the substrate are respectively fixed at 1200, 1000 and 1700 rpm. After two minutes drying, the deposited layers have respective indices of 1.601, 1.639 and 1.616 and each have a thickness of 167, 141 and 163 nm. The maximum reflection peaks (quarter wave peak) are respectively situated at 1070, 925 and 1053 nm before densification.

The values of n and Δe achieved, after exposure to UV (350 mW/cm² approximately), namely n=1.86, whichever solution is used and Δe between 44 and 51% are close (around 90%) of those obtained after heat treatment at 150° C. for 30 minutes (Δn≈0.05).

The resistance to abrasion properties are comparable to those obtained by thermal densification at 150° C. for 30 minutes, since the layers are not damaged during the "severe" test from the military standard US-MIL-C-0576-C, this being so whichever type of treatment solution was used.

The great difference between these two methods of densification (by UV exposure or by heat treatment) rests, in the same way as for the $Ta_2O_5$—$SiO_2$ (80/20) layer of medium index, in the state of the surface of the films: UV densification has the advantage of giving layers of $Ta_2O_5$ which are much more wettable than after the heat treatment. This effect of using UV does not depend on the type of treatment solution used.

The resistance to abrasion properties are maintained with thermally annealing and the high index $Ta_2O_5$ layers pass the "severe" test from the military standard US-MIL-C-0576-C whichever type of treatment solution is used.

EXAMPLE 6

Producing the anti-glare three layer, stacks, using UV exposure:

The treatment solutions used are the following:

$TaCl_5$—$Si(OEt)_4$/EtOH for the medium index layer, $TaCl_2(OEt)_3$/EtOH—$NH_3$ for the high index layer, polymeric $SiO_2$ HCl, polymeric $SiO_2$ $HNO_3$ or oligomeric $SiO_2$ for the low index layer. One begins by meticulously cleaning a substrate of 80 mm diameter, made of silicate glass, and the medium index layer of $Ta_2O_5$—$SiO_2$ (80/20) is deposited on the clean substrate. It is densified under UV at full power (that is to say with a dose of 350 mW/cm$^2$) and then the substrate is cooled for about 3 minutes with the help of a jet of air under pressure. Next the high index layer of Ta$_2$O$_5$ is deposited and it is densified under UV under the same conditions. Then the deposition of the low index layer of SiO$_2$ is carried out and this is exposed to UV with irradiation at 300 mW/cm$^2$.

Advantage is taken of the heating of the surface of the coating to about 80° C. to apply the hydrophobic agent to the hot surface by spraying.

The whole of the stack is subjected to heat treatment at 150° C. for 30 minutes, so as to complete the densification of the three layers. The total time taken to complete the process for a sheet of 80 mm diameter is about one hour.

The UV radiation dose of each layer can be varied.

The best results are obtained with the SiO$_2$ solution of the oligomeric type. This three layer coating, covered with the hydrophobic agent T2494 practically resists the "severe" abrasion test of the standard US-MIL-C-0675C, this only leading to a slight discoloration of the anti-glare coating.

In comparison, the tests with the layers of polymeric SiO$_2$ in an HCl or HNO$_3$ medium give coatings which are slightly more fragile to abrasion, the mechanical properties being comparable to those obtained by the manufacturing method that only uses heat treatments as a means of densification. In the case of the solution of oligomeric SiO$_2$, the precursor, coupled with the action of the UV, allows a strong interaction to be established between the layer of silica and the high index layer of Ta$_2$O$_5$ and thereby guarantee good mechanical strength.

The UV exposure dose appears to play an important role since when this is reduced, the resistance to abrasion of the coating at the level of the layers based on Ta$_2$O$_5$ and SiO$_2$ can be affected. Furthermore, passing the layer of the hydrophobic agent T2494 under the UV does not improve the mechanical properties of the three layer stack.

What is claimed is:

1. A polymeric inorganic material characterized in that said material is a material based on tantalum oxide, densified or cross-linked by a heat treatment at a temperature less than 200° C., or by an exposure to ultra-violet rays and in that said material comprises in addition residual halide ions.

2. The polymeric material according to claim 1, characterized in that said material comprises an inorganic, densified or cross-linked, tantalum oxy-hydroxide polymer.

3. The polymeric material according to claim 1, characterized in that said halide ions are chloride ions.

4. The polymeric material according to claim 1, characterized in that it comprises, apart from tantalum oxide, at least one other metal or metalloid oxide selected from the group consisting of titanium oxide, yttrium oxide, scandium oxide, zirconium oxide, hafnium oxide, thorium oxide, niobium oxide, lanthanum oxide, aluminum oxide, magnesium oxide and silicon oxide.

5. The polymeric material according to claim 1, characterized in that the one or more other metal or metalloid oxides are present in a proportion from about 1 to 99% by mass, with respect to the total mass of metal and metalloid oxides.

6. The polymeric material according to claim 1, characterized in that said inorganic polymeric material is a material with a high refractive index.

7. A method of preparation and of deposition of the inorganic polymeric material according to claim 1, characterized in that said method comprises the steps of:

preparing a first solution comprising a solvent and a tantalum molecular precursor compound selected from the group consisting of tantalum pentahalides of the formula TaX$_5$ wherein X is F, Br, I or Cl and TaCl$_2$(OEt)$_3$;

optionally mixing said first solution with a second solution comprising a second solvent of the same kind and one or more other metal or metalloid compound other than tantalum thereby obtaining a third solution;

depositing the first solution or the third solution onto a support wherein said depositing forms a uniform layer of polymeric material based on tantalum oxide; and cross-linking or densifying said uniform polymeric layer based on tantalum oxide, the cross-linking or densifying being accomplished by a heat treatment at a temperature below 200° C., or by an exposure to ultra-violet rays; and optionally said cross-linking or densifying is followed by an annealing step or a post-treatment heating step.

8. The method according to claim 7, characterized in that said heat treatment is carried out at a temperature of from 100 to 200° C. for a period of from 2 to 150 minutes.

9. The method according to claim 7, characterized in that said exposure to ultra-violet rays is carried out with an energy of from 5 to 10 J/cm$^2$ for a period of from 10 seconds to 10 minutes.

10. The method according to claim 7, characterized in that the solvent is a saturated aliphatic alcohol of the formula ROH, where R represents an alkyl group with from 1 to 5 carbon atoms.

11. The method according to claim 7, characterized in that the annealing step, or the post-treatment heat treatment is carried out at a temperature of from 80 to 200° C. for 10 to 60 minutes.

12. The method according to claim 7, further comprising the step of removing the excess halide ions from the first solution.

13. The method according to claim 12, characterized in that the excess halide ions in the first solution are removed by evaporation under reduced pressure and then redissolution.

14. The method according to claim 12, characterized in that the excess halide ions in the first solution are removed by chemical neutralization.

15. The method according to claim 7, characterized in that the solvent of the first solution is ethanol, optionally neutralized by NH$_3$, and the tantalum molecular precursor compound is selected from the group consisting of tantalum pentachloride and TaCl$_2$(OEt)$_3$.

16. An optical material, characterized in that it comprises an organic or inorganic substrate covered by at least one layer of the inorganic polymeric material based on tantalum oxide according to claim 1.

17. An optical material, characterized in that comprises an organic or inorganic substrate covered by at least one layer of the inorganic polymeric material based on tantalum oxide according to claim 6.

18. The optical material according to claim 17, characterized in that it further comprises at least one layer selected from the group consisting of:

a layer with a low refractive index comprising a component selected from the group consisting of colloids of silicon oxide, colloids of silicon oxide encased in a siloxane binder, colloids of calcium fluoride, colloids of calcium fluoride encased in a siloxane binder, colloids of magnesium fluoride, colloids of magnesium fluoride encased in a siloxane binder, silicon oxide in polymeric form and magnesium oxide in polymeric form;

a layer with a medium refractive index formed from a polymeric material based on tantalum oxide and another metal oxide; and an anti-abrasive layer, based on a fluorinated silane.

19. The optical material according to claim 18, characterized in that the layers with low or medium refractive index are densified or cross-linked polymeric layers.

20. The optical material according to claim 18, having anti-glare properties with a wide spectral band, characterized in that it comprises an organic or inorganic substrate covered successively by:

a layer with a medium refractive index;

a layer with a high refractive index;

a layer with a low refractive index; and optionally an anti-abrasive layer.

21. The optical material according to claim 18, having anti-glare properties with a narrow spectral band, characterized in that it comprises an organic or inorganic substrate covered successively by:

a layer with a high refractive index;

a layer with a low refractive index; and optionally an anti-abrasive layer.

22. The optical material according to claim 18, having reflecting properties, characterized in that it comprises an organic or inorganic substrate covered successively by at least one sequence of two layers wherein the layers are selected from the group consisting of:

a layer with a low refractive index;

a layer with a high refractive index; and optionally an anti-abrasive layer.

23. The optical material according to claim 18 characterized in that the substrate is an organic substrate covered by a lacquer.

24. The optical material according to claim 18 characterized in that the layer with a medium refractive index is formed from a polymeric material based on tantalum oxide and silicon oxide or based on tantalum oxide and magnesium oxide, wherein the refractive index can be modulated at will by varying the relative proportions in tantalum oxide and silicon oxide equivalents, or in tantalum oxide and magnesium oxide equivalents.

25. The optical material according to claim 18 characterized in that the layer with a low refractive index is a layer formed from polymeric silicon oxide selected from the group consisting of polymeric silicon oxide prepared in an HCl medium, polymeric silicon oxide prepared in an $HNO_3$ medium, and oligomeric silicon oxide.

26. The optical material according to claim 18, characterized in that the anti-abrasive layer is formed from $C_6F_{13}$—$CH_2CH_2$—$Si(OEt)_3$ or $C_6F_{13}$—$CH_2CH_2$—$SiCl_3$.

27. A method of preparing an anti-glare material with a wide spectral band according to claim 20, characterized in that it comprises the following steps:

cleaning-scouring the substrate;

depositing on the cleaned substrate the layer with medium refractive index;

optionally thermal cross-linking or densifying the deposited layer with a medium refractive index;

cleaning-scouring;

depositing the layer with a high refractive index based on $Ta_2O_5$;

optionally thermal cross-linking or densifying the deposited layer with a high refractive index;

cleaning-scouring as previously;

depositing the layer with a low refractive index;

optionally thermal cross-linking or densifying the deposited layer with a low refractive index;

applying the anti-abrasive layer onto the layer with a low index; and heat treatment.

28. The method according to claim 27, characterized in that, following the deposition of the layer with a high refractive index based on $Ta_2O_5$, the cross-linking or densification of this layer-and the cleaning and scouring of this layer, a period of from 1 to 24 hours is allowed to pass before carrying out a second scouring of the layer with a high refractive index and depositing the layer with a low refractive index.

29. The method according to claim 27, characterized in that, following the deposition of the layer with a high refractive index based on $Ta_2O_5$, a treatment is carried out of rinsing the deposited layer with a mixture of ammonia and ethanol; a heat treatment is then carried out under reduced pressure and the rinsing with ammonia/ethanol is repeated and then the cross-linking or densification of the layer with a high refractive index before depositing the layer with a low refractive index.

30. The method according to claim 29, characterized in that a period of from 1 to 24 hours is allowed to pass following the final rinsing with the ammonia/ethanol mixture before carrying out the deposition of the layer with a low index.

31. A method of preparing an anti-glare material with a wide spectral band according to claim 20, characterized in that it comprises the following steps:

cleaning-scouring the substrate;

depositing on the cleaned substrate the layer with medium refractive index, optionally cross-linking or densifying the deposited layer with a medium refractive index by exposure to ultra-violet rays;

depositing the layer with a high refractive index based on $Ta_2O_5$;

optionally cross-linking or densifying the deposited layer with a high refractive index by exposure to ultra-violet rays;

depositing the layer with a low refractive index;

cross-linking or densifying the deposited layer with a low refractive index by exposure to ultra-violet rays;

applying the anti-abrasive layer onto the layer with a low index; and heat treatment of the whole of the applied layers and the substrate.

32. A solution comprising a solvent;

a tantalum molecular precursor compound selected from the group consisting of tantalum pentahalides of the formula $TaX_5$ wherein X is F, Br, I or Cl, and $TaCl_2(OEt)_3$; and one or more other metal or metalloid compounds selected from the group consisting of titanium, silicon, yttrium, scandium, zirconium, hafnium, thorium, niobium, lanthanum, aluminum and magnesium.

33. The solution according to claim 32, in which said solvent is a saturated aliphatic alcohol of the formula ROH, where R represents an alkyl group of from 1 to 5 carbon atoms.

34. The solution according to claim 32, in which said one or more other metal or metalloid compounds are selected from the group consisting of alkoxide and halide metalloid compounds.

35. The solution according to claim 32, in which the concentration of the tantalum molecular precursor and said one or more other metal or metalloid compounds comprises from 1 to 20% by mass expressed as an oxide of the tantalum molecular precursor or the metal or metalloid compounds.

36. The solution according to claim 33 characterized in that the residual halide ions in the solution are removed from it.

37. The solution according to claim 36, characterized in that the residual halide ions in the solution are removed by evaporation under reduced pressure and then redissolution.

38. The solution according to claim 36, characterized in that the residual halide ions in the solution are removed by chemical neutralization.

39. The solution in ethanol, optionally neutralized with $NH_3$, of a tantalum molecular precursor compound selected from the group consisting of tantalum pentachloride and $TaCl_2(OEt)_3$.

40. A solution of $TaCL_2(OEt)_3$ in ethanol at a concentration of from 5 to 10% in mass equivalent of $Ta_2O_5$.

41. The polymeric material according to claim 5 characterized in that said inorganic polymeric material is a material with a high refractive index.

42. An optical material, characterized in that it comprises an organic or inorganic substrate covered by at least one layer of the inorganic polymeric material based on tantalum oxide according to claim 5.

43. The optical material according to claim 20 characterized in that the substrate is an organic substrate covered by a lacquer.

44. The optical material according to claim 21 characterized in that the substrate is an organic substrate covered by a lacquer.

45. The optical material according to claim 22 characterized in that the substrate is an organic substrate covered by a lacquer.

46. The optical material according to claim 20 characterized in that the layer with a medium refractive index is formed from a polymeric material based on tantalum oxide and silicon oxide or based on tantalum oxide and magnesium oxide, wherein the refractive index can be modulated at will by varying the relative proportions in tantalum oxide and silicon oxide equivalents, or in tantalum oxide and magnesium oxide equivalents.

47. The optical material according to claim 21 characterized in that the layer with a medium refractive index is formed from a polymeric material based on tantalum oxide and silicon oxide or based on tantalum oxide and magnesium oxide, wherein the refractive index can be modulated at will by varying the relative proportions in tantalum oxide and silicon oxide equivalents, or in tantalum oxide and magnesium oxide equivalents.

48. The optical material according to claim 22 characterized in that the layer with a medium refractive index is formed from a polymeric material based on tantalum oxide and silicon oxide or based on tantalum oxide and magnesium oxide, wherein the refractive index can be modulated at will by varying the relative proportions in tantalum oxide and silicon oxide equivalents, or in tantalum oxide and magnesium oxide equivalents.

49. The optical material according to claim 20 characterized in that the layer with a low refractive index is a layer formed from polymeric silicon oxide selected from the group consisting of polymeric silicon oxide prepared in an HCl medium, polymeric silicon oxide prepared in an $HNO_3$ medium, and oligomeric silicon oxide.

50. The optical material according to claim 21 characterized in that the layer with a low refractive index is a layer formed from polymeric silicon oxide selected from the group consisting of polymeric silicon oxide prepared in an HCl medium, polymeric silicon oxide prepared in an $HNO_3$ medium, and oligomeric silicon oxide.

51. The optical material according to claim 22 characterized in that the layer with a low refractive index is a layer formed from polymeric silicon oxide selected from the group consisting of polymeric silicon oxide prepared in an HCl medium, polymeric silicon oxide prepared in an $HNO_3$ medium, and oligomeric silicon oxide.

52. The optical material according to claim 20 characterized in that the anti-abrasive layer is formed from $C_6F_{13}$—$CH_2CH_2$—$Si(OEt)_3$ or $C_6F_{13}$—$CH_2CH_2$—$SiCl_3$.

53. The optical material according to claim 21 characterized in that the anti-abrasive layer is formed from $C_6F_{13}$—$CH_2CH_2$—$Si(OEt)_3$ or $C_6F_{13}$—$CH_2CH_2$—$SiCl_3$.

54. The optical material according to claim characterized in that the anti-abrasive layer is formed from $C_6F_{13}$—$CH_2CH_2$—$Si(OEt)_3$ or $C_6F_{13}$—$CH_2CH_2$—$SiCl_3$.

55. The solution according to claim 35 characterized in that the residual halide ions in the solution are removed from it.

56. The solution according to claim 35, in which the concentration of the tantalum molecular precursor and said one or more other metal or metalloid compounds comprises from 5 to 10% by mass expressed as an oxide of the tantalum molecular precursor or the metal or metalloid compounds.

* * * * *